Oct. 14, 1924.

T. J. FREDA

1,511,957

HORIZONTAL EARTH BORING MACHINE

Filed Nov. 14, 1921

T. J. FREDA 1,511,957

HORIZONTAL EARTH BORING MACHINE

Filed Nov. 14, 1921   9 Sheets-Sheet 3

INVENTOR.
Theophil J. Freda
BY
ATTORNEYS

Oct. 14, 1924.

T. J. FREDA

1,511,957

HORIZONTAL EARTH BORING MACHINE

Filed Nov. 14, 1921

Inventor
Theophil J. Freda

By
Attorneys

Oct. 14, 1924.

T. J. FREDA 1,511,957

HORIZONTAL EARTH BORING MACHINE

Filed Nov. 14, 1921   9 Sheets-Sheet 6

Inventor
Theophil J. Freda

By
Attorneys

Oct. 14, 1924.
T. J. FREDA
1,511,957

HORIZONTAL EARTH BORING MACHINE

Filed Nov. 14, 1921  9 Sheets-Sheet 7

INVENTOR.
Theophil J. Freda.
BY
ATTORNEYS

Patented Oct. 14, 1924.

1,511,957

UNITED STATES PATENT OFFICE.

THEOPHIL J. FREDA, OF DETROIT, MICHIGAN.

HORIZONTAL EARTH-BORING MACHINE.

Application filed November 14, 1921. Serial No. 514,860.

*To all whom it may concern:*

Be it known that I, THEOPHIL J. FREDA, a citizen of the United States of America, residing at Detroit, in the county of Wayne and State of Michigan, have invented certain new and useful Improvements in Horizontal Earth-Boring Machines, of which the following is a specification, reference being had therein to the accompanying drawings.

This invention relates to a horizontal earth boring machine, and the primary object of my invention is to provide an earth boring machine for expeditiously and economically boring tunnels, sewers, rooms and other subterranean cavities, the machine including means which obviates the manual transfer of earth from the seat of boring to a place where the earth can be removed to the surface.

Another object of this invention is to provide an earth boring machine which will progressively remove earth and enlarge a small boring to one of a desired diameter, the machine including a novel boring head which first produces a small hole that has its walls removed to form a larger hole and this hole is again enlarged as the machine is moved forward.

A further object of this invention is to provide a boring machine mounted on caterpillar tractors so that it may be forcibly advanced in a boring, and since the machine is used under ground an electrical source of energy is employed for moving the machine and operating boring and enlarging heads thereof.

A further object of this invention is to provide an earth boring head embodying scraping and cutting instrumentalities adapted to remove earth and deliver it to a series of buckets which eventually discharge the earth into an axially spiral conveyor adapted to remove the earth and prevent clogging and any interference with the operation of the boring head.

A still further object of this invention is to provide an earth boring machine that may be controlled by a single operator and thus obviate the necessity of using a large number of laborers when boring tunnels or the like.

The above and other objects are attained by a strong and durable machine that will be hereinafter described and then claimed, and reference will now be had to the drawings, wherein—

The machine comprises a main tractor 1 having caterpillar traction members 2 by which the machine may be moved from one location to another and advanced in a boring.

On the tractor 1 are sets of uprights 3 connected by transverse angle bars 4, said bars cooperating with the uprights in providing a skeleton framework which supports a platform 5.

On the platform 5 is an electric motor or other source of power and one end of the armature shaft 7 of said motor is journaled in a bearing 8 on the platform, while the opposite end of the armature shaft is provided with a gear wheel 9. Adjacent the armature shaft 7 are bearings 10 for another shaft provided with pulleys 11 and 12, the former having a belt 13 trained over a pulley 14 on the armature shaft 7. Trained over the pulley 12 is a twisted belt 15 extending downwardly to the platform 5 and the tractor 1 to the traction members 2 where a shaft 16 is driven at a reduced speed compared to the speed of the armature shaft 7. Power may be derived from the shaft 16 for operating the traction members 2 or the traction members may simply constitute supports for the boring machine that will permit of the machine being moved by some other source of power than that forming part of the machine.

Power is derived from the driven shaft 16, by a series of power transmission members 17 for operating an endless flat earth conveyor or apron 18 which travels longitudinally of the tractor. One end of the flat conveyor is supported by a roller 19 and brackets 20 from one end of the tractor, and the opposite end of the conveyor is supported by a scraper bulk head to be hereinafter described.

In advance of the main tractor 1 is an auxiliary tractor 21 having idle traction members 22 and the auxiliary tractor is adapted to be moved in an intermediate boring 23 of less diameter than the main or finished boring 24 in which the main tractor 1 is operated. On the auxiliary tractor 21 are brackets 25 supporting end heads 26 and 27 connected by a longitudinal tube or earth conduit 28 with the rear end of said tube provided with a chute 29 which has depending bearings 30 and a roller 31 supporting the forward end of the flat endless conveyor 18. The chute 29 is above the forward end of the conveyor 18 and earth from the tube 28 is deposited on the conveyor 18 and carried rearwardly of the main tractor 1, from which point it may be transferred to the surface of the ground.

Figures 10, 11:
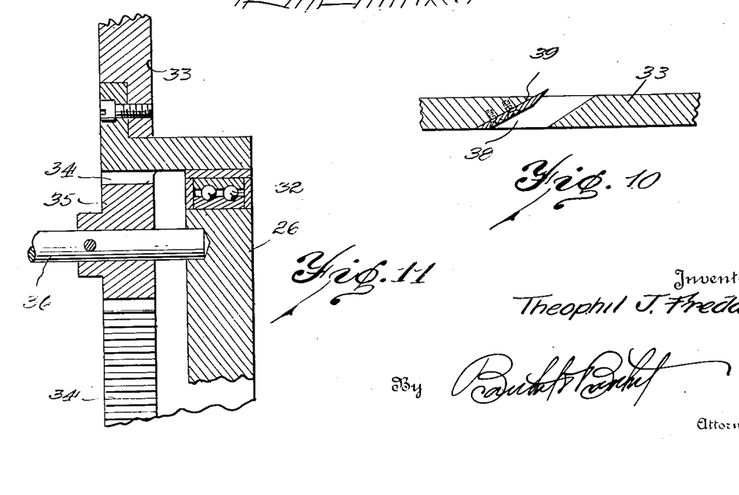
Fig. 10 is a detail sectional view of a portion of a bulk head or rotary scraper, taken on the line 10—10 of Fig. 9.
Fig. 11 is an enlarged detail sectional view taken on the line 11—11 of Fig. 9.

On the rear head 26 of the auxiliary tractor 21 is an anti-frictional bearing 32 for a rotary bulk head 33 that produces the large boring 24. The rotary bulk head 33 has an internal rack 34 and meshing with said rack, as best shown in Fig. 11, is a pinion 35 mounted on a shaft 36 having its ends supported by the head 26 and the base of the electric motor 6. On the shaft 36, adjacent the electric motor 6, is a gear wheel 37 meshing with the gear wheel 9 of the armature shaft 7, and the rotary bulk head 33 may be driven from the electric motor.

The rotary bulk head 33 has a series of tangentially disposed slots 38 in which are mounted scraper or shearing blades 39 operatable against the inner end wall 40 of the intermediate boring 23 to enlarge this boring and produce the large boring 24.

Suitably mounted on the rear face of the rotary bulk head 33 is an annular hollow casing 41 containing tangentially disposed buckets 42, said buckets cooperating with the casing 41 in receiving earth removed by the rotary scraper bulk head. The buckets 42 are disposed so that such earth as accumulates within the casing 41 will be elevated to the upper portion of the casing and discharged on to deflectors 43 at the sides of the chute 29, said deflectors providing a large trough to receive the earth so that the chute 29 may deposit the same on the rearwardly traveling flat conveyor 18. The casing 41 has a configuration which prevents earth from being accidentally discharged into the large boring 24, and the diameter of the rotary bulk head will determine the diameter of the large boring 24.

Figure 13:
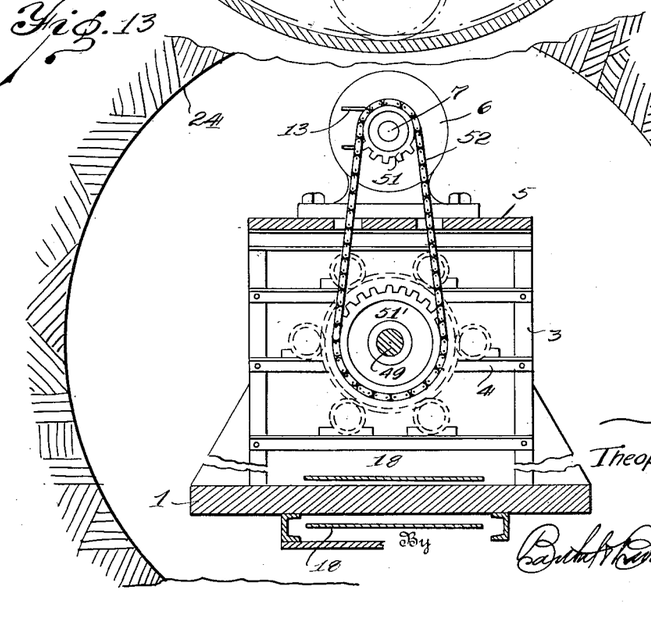
Fig. 13 is a similar view taken on the line 13—13 of Fig. 2.
Figure 14:
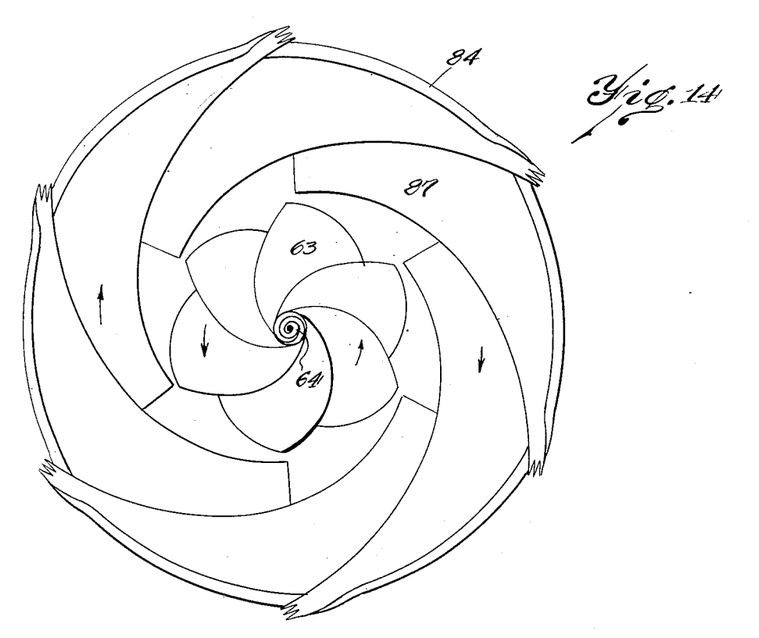
Fig. 14 is an end view of the small boring instrumentality.
Figure 15:
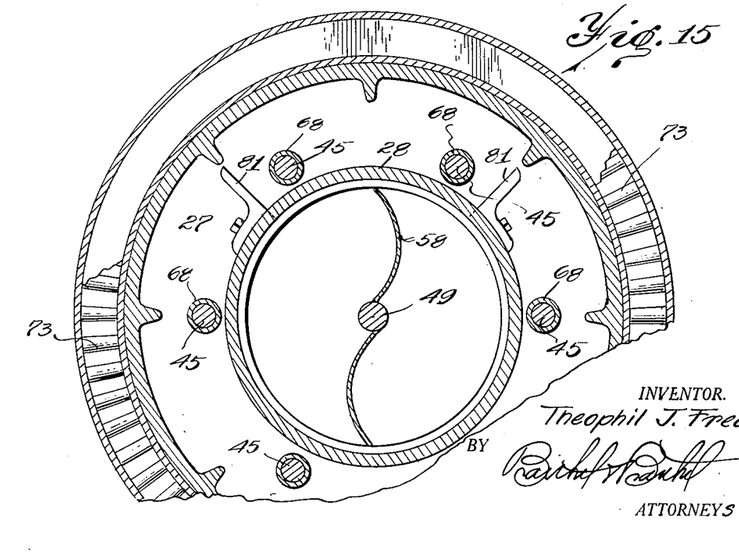
Fig. 15 is a fragmentary cross sectional view taken on the line 15—15 of Fig. 3.
Figures 16, 17:
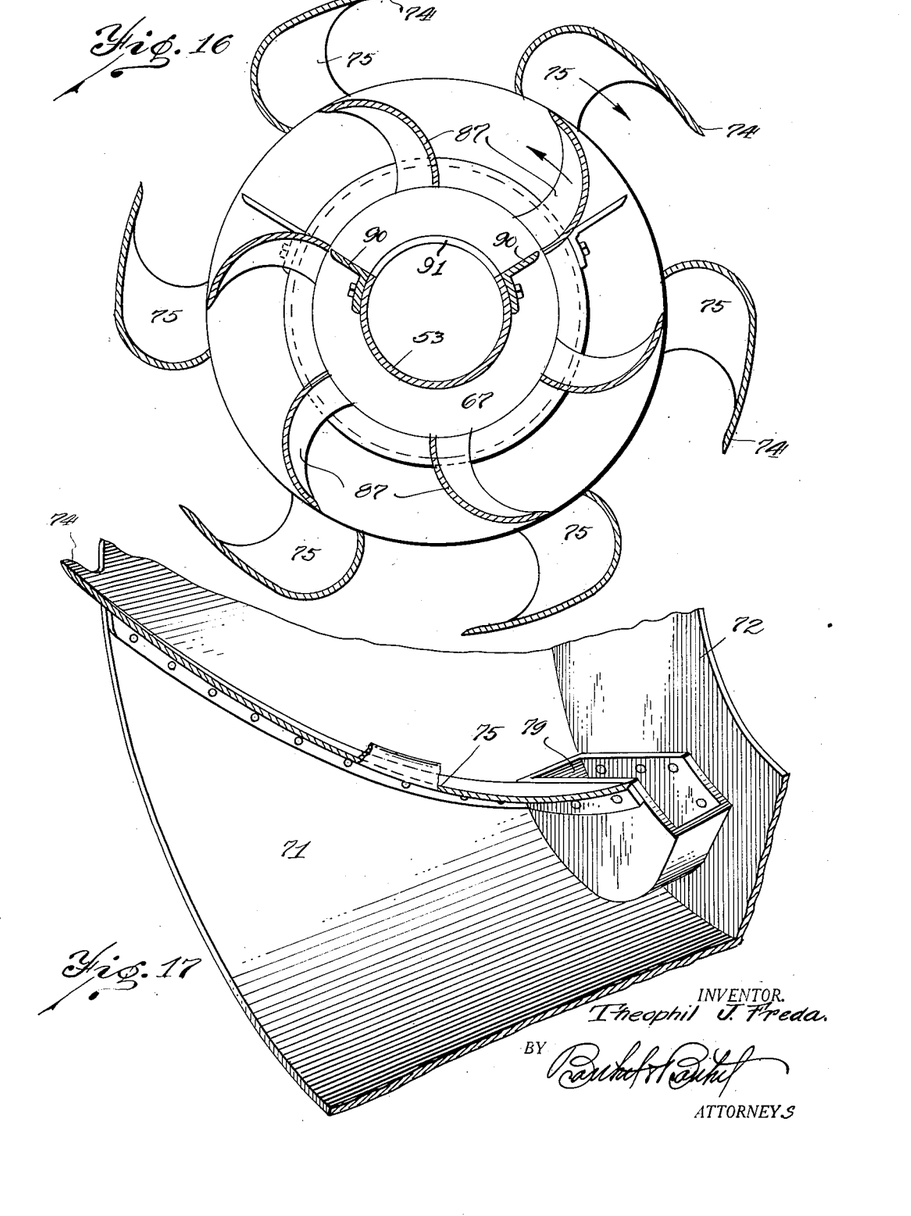
Fig. 16, is a similar view taken on the line 16—16 of Fig. 3.
Fig. 17, is a perspective view of a portion of the intermediate boring instrumentality.

On the auxiliary tractor 21, between the heads 26 and 27, are connected bearings 44 disposed about the tube 28 and cooperating with the heads 26 and 27 in providing a substantial support for the tube on the auxiliary tractor 21. Journaled in the bearings 44 are circumferentially arranged longitudinal parallel shafts 45 which extend through the heads 26 and 27 and may have bearing in said heads. The rear ends of the shafts 45 are journaled in bearings 46 mounted on the transverse bars 4 of the main tractor and said shafts have pinions 47 meshing with a large gear wheel 48 mounted on a central driven shaft 49 of the boring machine. The rear end of the shaft 49 is journaled in a bearing 50 on the main tractor 1 and said shaft is driven from the armature shaft 7 by sprocket wheels 51, a sprocket chain 52 or other power transmission member. See Figs. 1 and 13.

The forward end of the tube or earth conduit 28 is reduced to provide stepped portions 53 and 54, the latter terminating in a nose 55. In the forward end of the tube 28, adjacent the stepped portion 53, is an inwardly projecting hanger 56 provided with a bearing 57 for the forward end of a driven shaft 49, said shaft extending axially of the tube 28 and having a screw conveyor 58 by which earth is transferred from the forward end of the tube to the chute 29.

Journaled in the nose 55 of the tube 28 is a combined screw conveyor and auger or bit shaft 59 which has its rear end mounted in the forward end of the conveyor shaft 49 to be driven thereby, and on the shaft 59, within the stepped portions 53 and 54 of the tube 28, is a screw conveyor 60 adapted to convey earth from the stepped portions of the tube into the tube proper so that the earth may be conducted through the tube by the conveyor 58.

The shaft 59 protrudes from the nose 55, and surrounding said shaft against said nose is an end thrust bearing 61 for an auger or bit 62 provided with spiral cutting or boring blades 63 which converge to a screw 64 at the end of the shaft 59. The screw 64 constitutes a starting device for the auger or bit, and the rear ends of the blade 63 terminate at buckets 65 arranged circumferentially of the auger or bit, with the buckets tangentially disposed somewhat similar to the buckets 42, and adapted to discharge earth into the stepped portion 54 of the tube 28, said stepped portion having an opening through which the earth is discharged, so that the screw conveyor 60 may shift the earth to the main screw conveyor 58.

On the forward end of the tube 28 and on the stepped portion 53 thereof are peripheral flanges 66 and 67 into which extend the forward ends of the shafts 45, said shafts having covers 68 between the head 27 and the flange 66. On the flange 66 is an anti-frictional bearing 69 for the hub portion 70 of a large boring head 71, said head having a rear wall 72 at the head 27 and bearing on an end thrust bearing 73 interposed between the head 27 and the wall 72 of the boring head 71. The boring head 71 is cylindrical with its forward end terminating in a flared feather edge 74. In the head are mounted curved tangentially disposed cutting blades 75 and the outer small ends of said blades protrude beyond the feather edge of the head 71 and terminate in teeth 76 adapted to engage the inner end wall 77 of the boring 23 and enlarge a boring 78 produced by a small boring head surrounding the auger or bit 62 and hereinafter referred to.

Figure 18:
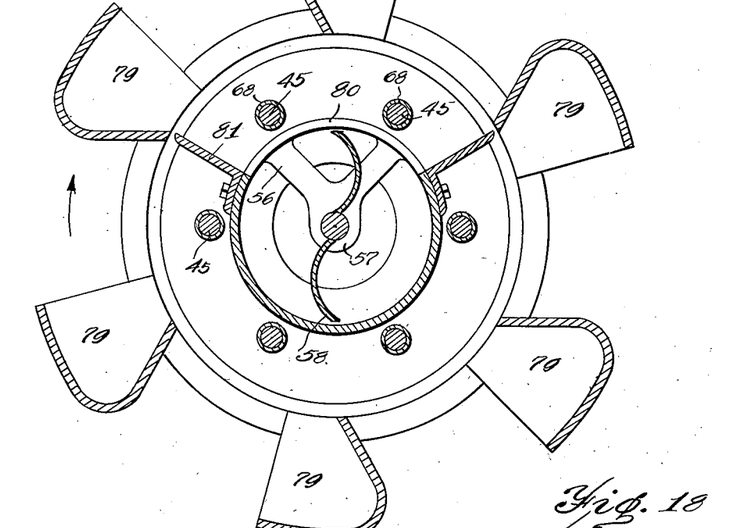
Fig. 18 is a cross sectional view taken on the line 18—18 of Fig. 3.

The inner large ends of the blade 75 terminate at radially disposed buckets 79 at the wall 72 of the boring head 71 and these buckets are adapted to scoop earth from the bottom of the head 71 and receive earth from between the blades 75 to discharge the earth into the forward end of the tube 28, said tube having an opening 80 and deflectors 81, as best shown in Fig. 18. The deflectors 81 form a trough into which the earth may be deposited to fall through the opening 80 on to the screw conveyor 58.

In the hub 70 of the large boring head 71 is an anti-frictional bearing 82 for the rear end 83 of a small boring head 84. This head is cylindrical and in many respects similar to the large boring head 71. The small boring head 84 has a hub 85 engaging an anti-frictional bearing 86 on the stepped portion 53 of the tube 28, and in the small boring head 84 are curved, tangentially disposed and tapered cutting blades 87 similar to the blades 75 of the large boring head 71. The inner ends of the blades 87 terminate at buckets 89 adapted to discharge into a trough formed by deflectors 90 at the sides of an opening 91 in the stepped portion 53 of the tube 28.

Figure 19:
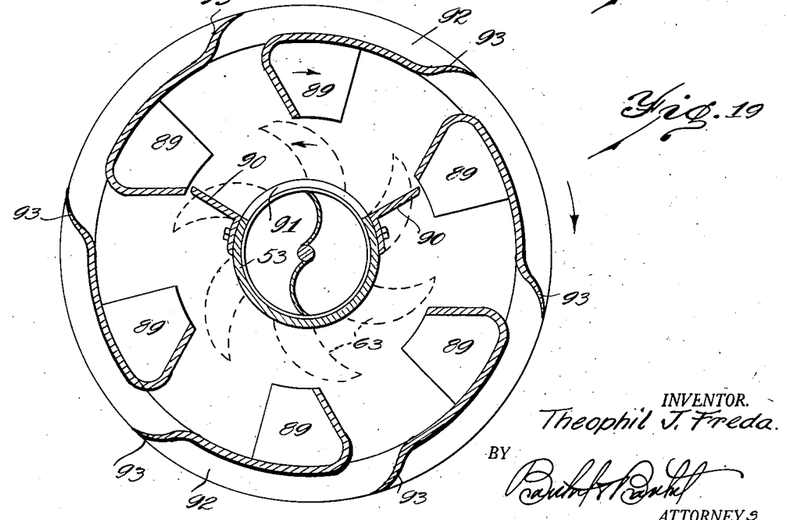
Fig. 19 is a similar view taken on the line 19—19 of Fig. 3.

To prevent earth from interfering with the anti-frictional bearing 82 the small boring head 84 has a peripheral flange 92 and the bottom of each pocket 89 is continued circumferentially of the head to form cutting knives or blades 93 connecting the flange 92 to the head 84. With the knives or blades 93 tangentially disposed between the buckets 89 the earth cut or removed by the knives or blades will be gathered into the buckets and eventually be discharged into the stepped portion 53 of the tube 28. The construction of the inner end of the small boring head is best shown in Fig. 19, and it is now apparent that the small boring head 84 is somewhat similar to the large boring head 71 and this also holds true of the inner end of the auger or bit 62.

Figure 3:
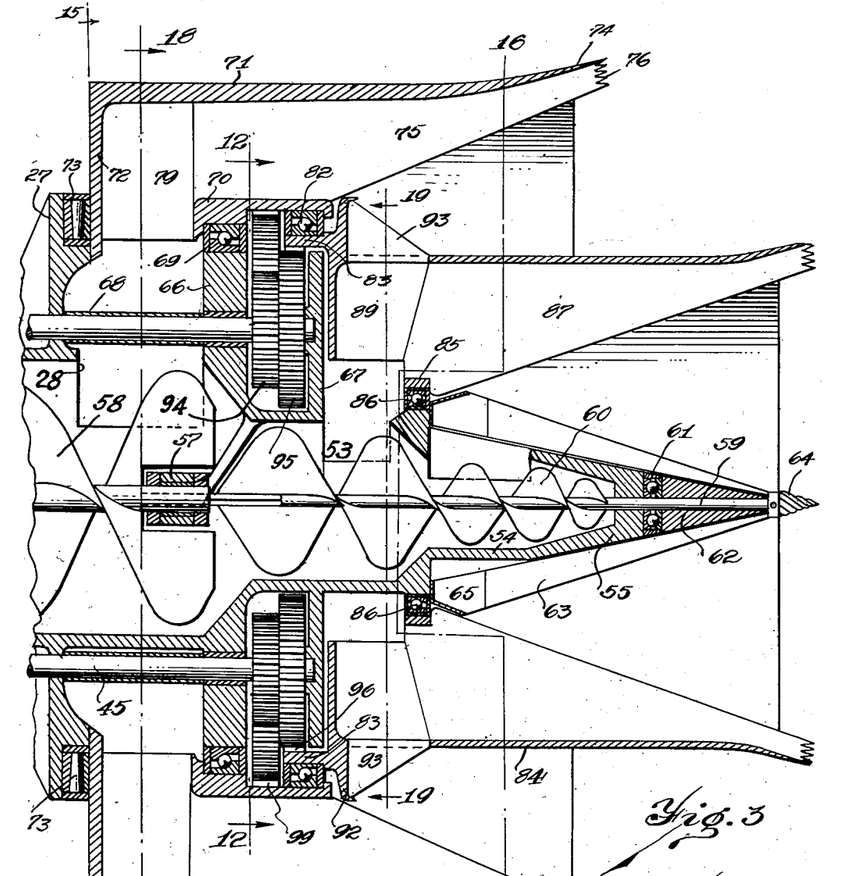
Fig. 3 is an enlarged longitudinal sectional view of the boring head of the machine.
Figure 12:
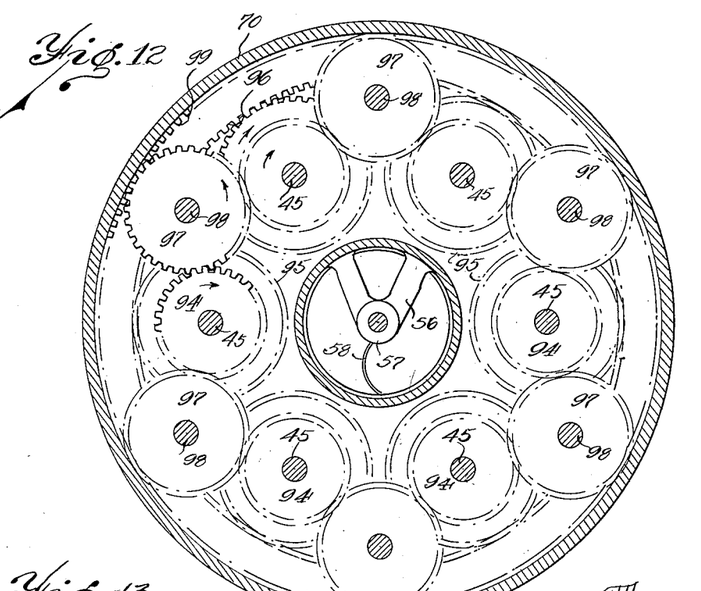
Fig. 12 is a cross sectional view taken on the line 12—12 of Fig. 3.

The large and small boring heads are supported by the anti-frictional and end thrust bearings so that said heads may be revolved in opposite directions and driven from the series of shafts 45. For this purpose, the forward ends of the shafts 45 have integral gear wheels 94 and 95. The gear wheels 95 mesh with an internal rack 96 on the inner end 83 of the small boring head 84, and the gear wheels 94 mesh with gear wheels 97 mounted on shafts 98 journaled in the flanges 66 and 67 of the tube 28. The gear wheels 97 mesh with an internal rack 99 in the hub portion 70 of a large boring head 71, and by virtue of the gear wheels 97 being between the rack 99 and the gear wheels 94 the large boring head 71 will be revolved in an opposite direction from that of the small boring head 84. The transmission of power from the shafts 45 to the boring heads is best brought out in Fig. 12, and by referring to Fig. 3 it will be noted that the flanges 66 and 67, the hub 70 of the large boring head 71, and the rear end 83 of the small boring head 84 all cooperate in providing a housing about the forward end of the tube for the racks and gear wheels by which power is transmitted to the boring heads from the shafts 45.

Figure 1:
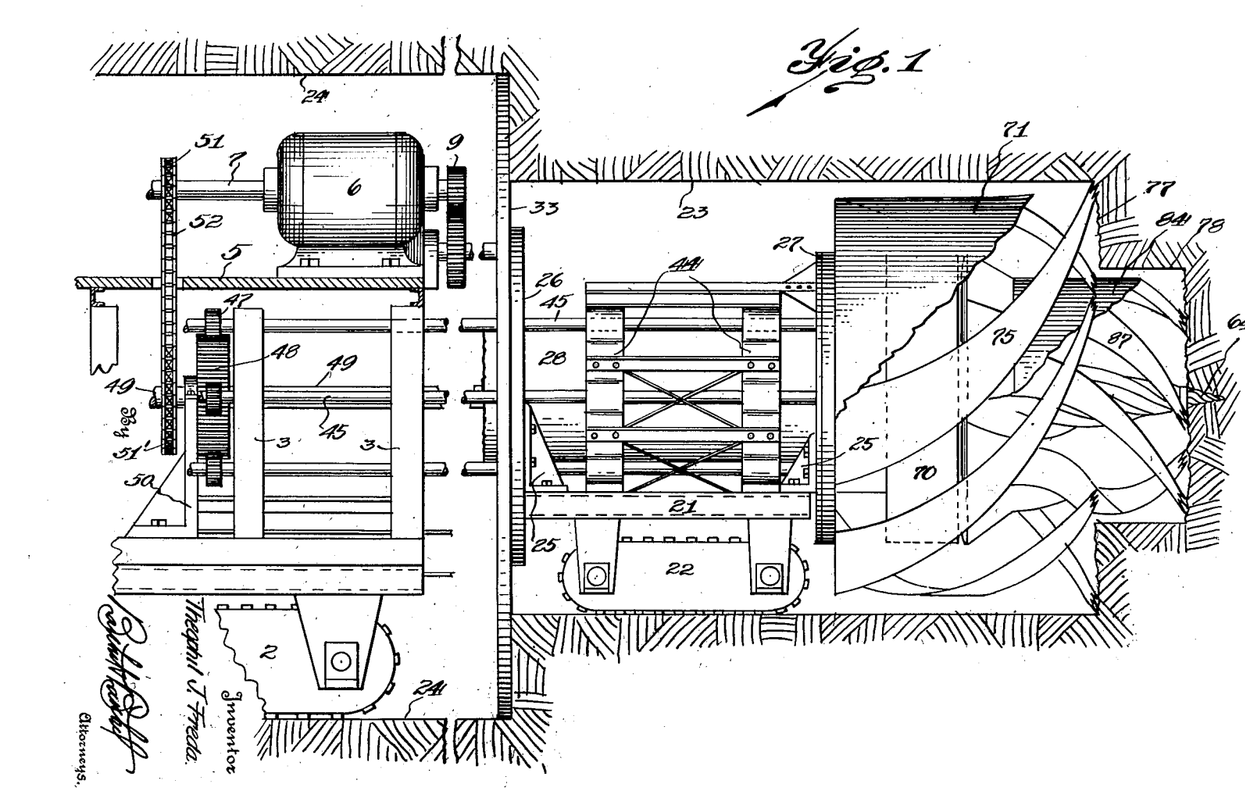
Figure 1 is a side elevation of the earth boring machine, partly broken away and partly in section, showing a machine in a boring.
Figure 2:
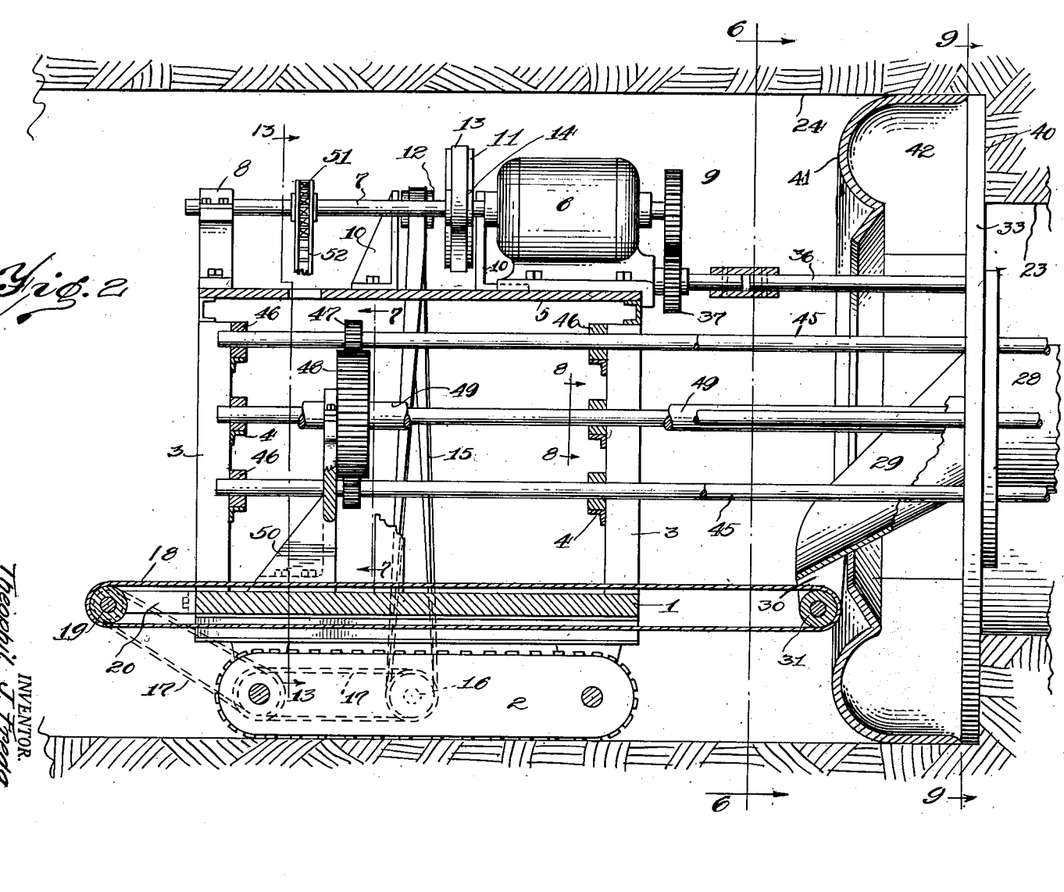
Fig. 2 is an enlarged longitudinal sectional view of the rear portion of the machine, showing a main tractor and the source of power for operating the machine.
Figure 4:
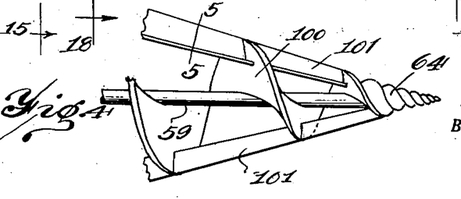
Fig. 4 is a side elevation of a modified form of auger or bit for the boring head.
Figure 5:
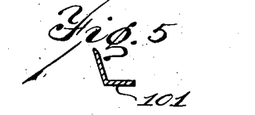
Fig. 5 is a cross sectional view taken on the line 5—5 of Fig. 4.
Figure 6:
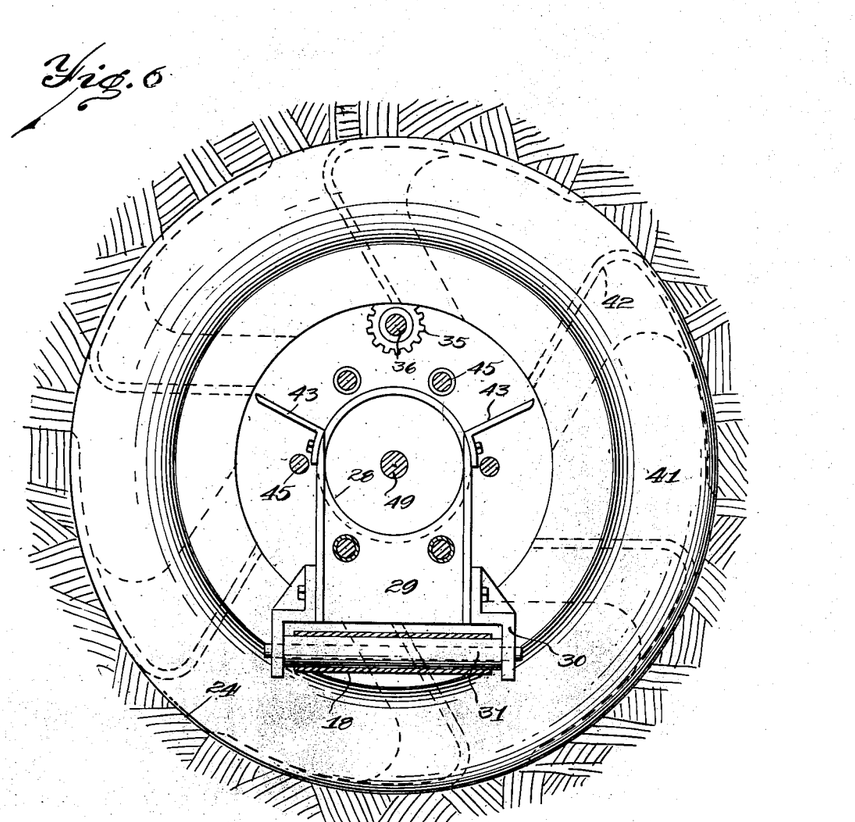
Fig. 6 is a cross sectional view taken on the line 6—6 of Fig. 2.
Figure 7:
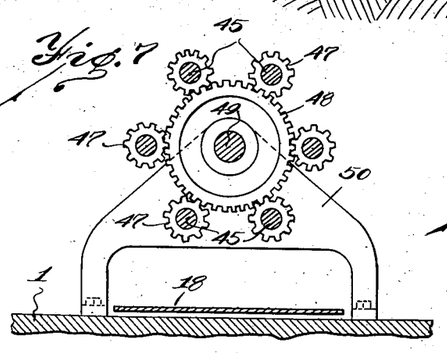
Fig. 7 is a similar view taken on the line 7—7 of Fig. 2.
Figure 8:
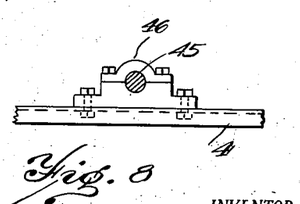
Fig. 8 is a similar view taken on the line 8—8 of Fig. 2.
Figure 9:
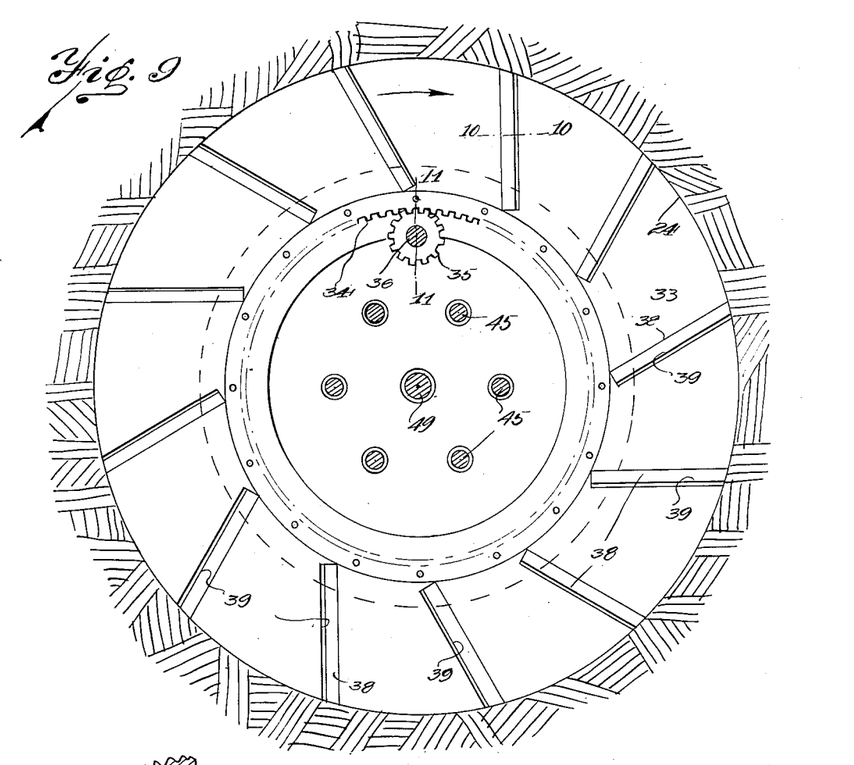
Fig. 9 is a cross sectional view taken on the line 9—9 of Fig. 2.

By reference to Fig. 1, it will be noted that the small boring head 84 produces the boring 78 in which the screw 64 is started to establish an axis about which the borings 78, 23 and 24 are made, and since the auger or bit is located within the small boring head 84 the earth attacked by the small boring head will be thoroughly disintegrated so that it may readily enter the forward end of the tube 28. I may use an auger or bit such as shown in Figs. 4 and 5, the auger including a screw 100 having its convolutions connected by angle bars 101 with a flange of each angle bar beveled or sharpened so that it will have a cutting action and readily enter the earth. With the cutting blades 87 arranged the reverse of the cutting blades 75 and driven in opposite directions the borings 78 and 23 can be easily produced and as the machine is advanced the intermediate boring 23 is enlarged to produce a finished boring 84.

When indurate earth, such as hard shale is encountered, power may be applied to the traction members 22 of the auxiliary tractor 21, otherwise the auxiliary tractor simply constitutes means for movably supporting the forward end of the boring machine in the intermediate boring 23. When the machine is to be moved above ground this end of the machine may be supported by a trailer or truck to prevent tilting of the boring machine or one end of the main tractor may be weighted as a counterbalance for the overhanging forward end. It is obvious that the driven shafts 45 and 49 may be made in sections so that the tractors may be separated should it be necessary to divide the boring machine for transportation on freight cars. This is particularly true when the machines are built on a large scale, but for ordinary sewer excavating the boring machine may remain intact when being moved from one location to another.

It is thought that the operation and utility of the boring machine will be apparent without further description and while in the drawings there are illustrated the preferred embodiments of my invention, it is to be understood that the structural elements are susceptible to such variations and modifications as fall within the scope of the appended claims.

What I claim is:—

1. An earth boring machine of the horizontal type, comprising a tractor, an endless apron conveyor of greater length than said tractor and driven therefrom, an earth conduit extending from the forward end of said tractor and having its rear end discharging on to said endless apron conveyor, a spiral conveyor in said conduit, a boring head at the outer end of said conduit adapted to deliver earth into said conduit, and means on said tractor for simultaneously operating said spiral conveyor and said boring head, said means being also adapted for operating said tractor and said apron conveyor.

2. An earth boring machine as in claim 1, and a rotary earth cutting bulkhead at the inner end of said conduit operated in synchronism with said conveyor and boring head.

3. An earth boring machine of the horizontal type, comprising a tractor, an earth conduit extending from the forward end of said tractor, a conveyor in said conduit, large and small concentric boring heads at the outer end of said conduit adapted to be revolved in opposite directions and deliver earth into said conduit, and means operated from said tractor for operating said conveyor and boring heads in synchronism.

4. An earth boring machine of the horizontal type, comprising a tractor, an earth conduit extending from the forward end of said tractor, a conveyor in said conduit, large and small boring heads at the outer end of said conduit adapted to deliver earth into said conduit, a conveyor centrally of the small boring head providing a starting device therefor, and means operated from said tractor for operating said conveyor and boring heads in synchronism.

5. An earth boring machine as in claim 3, wherein said means includes a conveyor shaft in said conduit for revolving said large and small boring heads, and a series of shafts outside of said conduit.

6. An earth boring machine comprising a tractor adapted to travel in a large boring, an earth conduit extending from the forward end of said tractor, boring heads at the outer end of said conduit adapted to produce a small boring, means in said conduit for conducting earth through said conduit, and means on said tractor for operating said boring heads.

7. An earth boring machine as in claim 6, and an auxiliary tractor under said conduit adjacent said boring heads and adapted to travel in the small boring.

8. In an earth boring machine, a large boring head, a small boring head, an auger, said heads and auger having a common axis, an earth screw conveyor axially of said heads adapted to receive earth from said heads and said auger, and means adapted to revolve said boring heads, screw conveyor and auger.

9. An earth boring machine as in claim 8, wherein said means includes a shaft axially of said screw conveyor, and a series of shafts operating said boring heads independent of said conveyor and said auger.

10. An earth boring machine as in claim 8, wherein each boring head includes curved circumferentially arranged earth cutting blades with buckets at the rear ends thereof adapted to discharge earth into said conveyor.

11. In an earth boring machine, an earth conduit, a screw conveyor therein, an auger coaxial of said screw conveyor and operated thereby, concentric boring heads rotatably supported by said conduit and adapted to deliver earth into said conduit, and operating means at an end of said conduit for operating said conveyor and said boring heads.

12. An earth boring machine as in claim 11, wherein said operating means includes a series of shafts and power transmission mechanism by which said boring heads are revolved in opposite directions.

13. An earth boring machine as in claim 11, wherein each boring head includes spirally arranged earth cutting blades with buckets at the rear ends thereof.

14. In an earth boring machine wherein borings of different diameters are produced by the small borings being enlarged by end wall cutting:—a tractor, a rotary earth cutting bulkhead at said tractor adapted to produce a large bore, concentric rotary boring heads in advance of said bulkhead adapted to produce smaller bores, a plurality of shafts extending through said bulkhead for revolving said boring heads, another shaft for revolving said bulk head, and means on said tractor for driving all of said shafts.

15. An earth boring machine as in claim 14, and an earth conduit extending from said boring heads centrally of the plurality of shafts and through said bulkhead adapted to receive earth from said boring heads and said bulkhead.

16. In an earth boring machine wherein borings of different diameters are produced by the small borings being enlarged by end wall cutting:—a tractor, a rotary earth cutting bulk head at said tractor adapted to produce a large bore, concentric rotary boring heads in advance of said bulk head adapted to produce smaller bores, and a power transmission mechanism between said rotary heads and operatable from said tractor causing one head to be revolved in an opposite direction to the other head.

17. In an earth boring machine wherein borings of different diameters are produced by the small borings being enlarged by end wall cutting:—a trailer, an earth conduit extending forward from said tractor, a conveyor on said conduit, a rotary earth cutting bulkhead at the rear end of said conduit adapted to produce a large bore, rotary boring heads at the forward end of said conduit adapted to produce small bores one in advance of the other and deposit earth in said conduit, and means on said tractor adapted to operate said bulkhead, conveyor and boring heads.

18. An earth boring machine as in claim 17, and an auxiliary tractor under sa d conduit adjacent said boring heads.

19. An earth boring machine as in claim 17, wherein the rotary boring heads are concentrically disposed coaxially of the conduit, and an auger in one of said heads is driven from said conveyor.

20. In an earth boring machine, a conduit for removing earth, a large rotary boring head on said conduit, a small rotary boring head on said conduit and extending into said large boring head, buckets in each boring head adapted to discharge earth into said conduit, and means for revolving said large and small boring heads in opposite directions.

21. An earth boring machine as in claim 20, and a screw conveyor in said conduit, and an auger in the small boring head operated from said screw conveyor.

22. An earth boring machine as in claim 20, wherein said means includes shafts along said conduit and a power transmission mechanism operated by said shafts and causing said boring heads to revolve in opposite direction.

23. In an earth boring machine, a conduit, a boring head at the outer end of said conduit, buckets in said head adapted to receive earth and discharge it into said conduit, said buckets having front open sides, curved tangentially disposed plates in said head adapted to direct earth into said buckets, said plates terminating in teeth outside of said head, means in said conduit for moving earth therein, and means for revolving said boring head and the buckets and plates therein.

24. An earth boring machine as in claim 23, wherein the boring head is rotatable on the conduit and a trough carried by said conduit which deflects earth therein from said buckets.

25. An earth boring machine as in claim 23, wherein said conduit supports radial and end thrust bearings for said boring head.

26. An earth boring machine as in claim 23, wherein the conduit has a nose, and an auger on said nose is operated by the earth moving means in said conduit.

27. In a horizontal earth boring machine, an earth receiving conduit, large and small boring heads rotatable on said conduit, buckets and plates in said heads with the plates disposed to direct earth into said buckets and said buckets arranged to discharge earth into said conduit, a power transmission mechanism between said small and large heads to cause said heads to revolve in opposite directions, and means exteriorly of said conduit and parallel to the axis thereof for driving said power transmission mechanism.

In testimony whereof I affix my signature in presence of two witnesses.

THEOPHIL J. FREDA.

Witnesses:
KARL H. BUTLER,
CHAS. W. STAUFFIGER.